United States Patent Office 3,567,425
Patented Mar. 2, 1971

3,567,425
HERBICIDAL N-FORMYLCARBANILATES
John Frank Olin, Ballwin, Mo., assignor to
Monsanto Company, St. Louis, Mo.
No Drawing. Original application Mar. 21, 1966, Ser. No. 535,737, now Patent No. 3,457,296, dated July 22, 1969. Divided and this application Jan. 10, 1969, Ser. No. 801,907
Int. Cl. A01n 9/20
U.S. Cl. 71—111
19 Claims

ABSTRACT OF THE DISCLOSURE

Phytotoxic composition, and method of use, comprising as the active ingredient a compound of the formula:

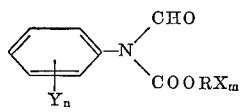

wherein Y is halogen, hydroxyl, alkyl or alkoxy having not more than 5 carbon atoms, R is hydrocarbyl of not more than 5 carbon atoms selected from the group consisting of alkyl, alkenyl and alkynyl, X is halogen (Cl, Br, I and F), $n$ is an integer from 0 to 5, inclusive, and $m$ is an integer from 0 to 3, inclusive.

---

This application is a division of copending application Ser. No. 535,737, filed Mar. 21, 1966, now Pat. No. 3,457,296, which in turn is a continuation-in-part of copending application Ser. No. 348,810 filed Mar. 2, 1964, now abandoned.

This invention relates to novel N-formylcarbanilates which are useful as biocides, particularly phytotoxicants, and to processes for making them. This invention further relates to phytotoxic compositions and to methods of controlling or modifying the growth of plant systems therewith.

The term "phytotoxicant" as used herein and in the appended claims means materials having a modifying effect upon the growth of plant systems. Such modifying effects include all deviations from natural development, for example, killing, retardation, defoliation, desiccation, regulation, stunting, tillering, stimulation, dwarfing and the like. In like manner, "phytotoxic" and "phytotoxicity" are used to identify the growth modifying activity of the compounds and compositions of this invention.

The term "plant system" as used herein and in the appended claims means germinant seeds, emerging seedlings and established vegetation including the roots and aboveground portions.

An object of this invention is to provide novel phytotoxic compositions. Another object is to provide methods for the modification and control of plant systems. Still another object is to provide certain novel N-formylcarbanilates and processes for making them. These and other objects will be apparent from a consideration of the accompanying disclosure.

The novel N-formylcarbanilates of this invention are represented by the formula:

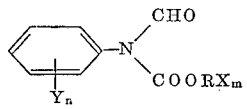

wherein Y is halogen, hydroxyl, alkyl or alkoxy having not more than 5 carbon atoms, R is hydrocarbyl of not more than 5 carbon atoms selected from the group consisting of alkyl, alkenyl and alkynyl, X is halogen (Cl, Br, I and F), $n$ is an integer from 0 to 5, inclusive, and $m$ is an integer from 0 to 3, inclusive.

In the above formula —$RX_m$ can be alkyl, for example, methyl, ethyl, n-propyl, isopropyl, n-butyl, isobutyl, sec-butyl, tert-butyl and n-amyl; alkenyl, for example, vinyl, allyl, n-butenyl-1, n-butenyl-2, 2-methylpropenyl-1, 3-methylbutenyl-1 and n-pentenyl-1; alkynyl, for example, propargyl and the various homologues and isomeric forms of alkynyl having not more than 5 carbon atoms; haloalkyl, for example, chloromethyl, bromomethyl, iodomethyl, dichloromethyl, trichloromethyl, tribromomethyl, chloroethyl, fluoroethyl, dichloroethyl, chloropropyl, bromopropyl, trichloropropyl, dichloropropyl, diiodopropyl, chlorobutyl, bromobutyl, dichlorobutyl, trifluorobutyl, trichlorobutyl and chloroamyl; haloalkenyl, for example, chlorovinyl, bromovinyl, chloropropenyl, dichlorobutenyl, tribromopropenyl, trichlorobutenyl, 2-difluoromethylpropenyl-1 and 2-dichloromethylbutenyl-1, and haloalkynyl, for example dichloropropargyl, bromopropargyl, iodopropargyl and the various homologues and isomeric forms of haloalkynyl having not more than 5 carbon atoms.

In the above formula Y as a halogen atom can be chloride, bromide, iodide or fluoride but is preferably chloride or bromide. As an alkyl group, Y can be tertiary alkyl but is preferably primary or secondary alkyl. If Y is tert-alkyl, it is preferred that the tert-alkyl group not be positioned in an ortho position. Representative Y alkyl and alkoxy for the above formula include by way of example methyl, ethyl, n-propyl, isopropyl, n-butyl, isobutyl, sec-butyl, tert-butyl, n-amyl, methoxy, ethoxy, n-propoxy, isopropoxy, n-butoxy and tert-butoxy.

In the above formula $n$ can be an integer from 0 to 5 but is preferably an integer from 0 to 3.

The N-formylcarbanilates of this invention are prepared by a process which comprises reacting a compound of the formula:

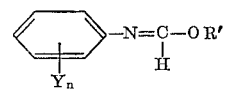

wherein Y and $n$ are as defined above and R' is alkyl having from 1 to 12 carbon atoms with a compound of the formula

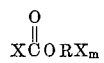

wherein R, X and $m$ are as defined above. It is preferred but not assential that R' have not more than about 5 carbon atoms. In some cases an exothermic reaction occurs upon admixture of reactants. After the exothermic reaction, if any, has subsided, the reaction is carried out at a temperature sufficient to split off alkyl halide and complete the reaction. Reaction temperatures in the range of about 50° C. to about 200° C. and preferably below about 150° C. are usually employed. The reaction is usually completed in from a few minutes to a number of days. However, time and temperature of reaction can vary with the particular reactants involved. It is preferred to carry out the reaction in an inert organic medium such as a saturated aliphatic or aromatic hydrocarbon, e.g. hexane, heptane, benzene, toluene, xylenes or the like. For phytotoxic use the reaction mixture containing the product can be used without purification but it is preferred to separate and purify the product by conventional means such as crystallization, distillation, adsorption, absorption, extractive distillation or any suitable combination of these.

In accordance with this invention it has been found that the growth of germinant seeds, emergent seedlings, and established vegetation can be controlled or modified by exposing the germinant seeds, emerging seedlings or the roots or above-ground portions of established vegetation to the action of an effective amount of one or more of the N-formylcarbanilates of the present invention. These compounds are effective as general phytotoxicants including post-emergent phytotoxicants and pre-emergent phytotoxicants but their most outstanding utility is as post-emergent phytotoxicants. Furthermore, these compounds are characterized by a broad spectrum of herbicidal or phytotoxicant activity, i.e. they modify the growth of a wide variety of plant systems including both broadleaf and grass plants. For the sake of brevity and simplicity, the term "active ingredient" will be used hereinafter to describe the N-formylcarbanilates of this invention.

The phytotoxic or herbicidal compositions of this invention contain at least one active ingredient and a material referred to in the art as a phytotoxic adjuvant in liquid or solid form. The phytotoxic compositions are prepared by admixing the active ingredient with an adjuvant including diluents, extenders, carriers and conditioning agents to provide compositions in the form of finely-divided particulate solids, granules, pellets, solutions and aqueous dispersions or emulsions. Thus the active ingredient can be used with an adjuvant such as a finely-divided particulate solid, a solvent liquid or organic origin, water, a wetting agent, dispersing agent, an emulsifying agent or any suitable combination of these.

The term "phytotoxic composition" as used herein and in the appended claims is intended to mean not only compositions in a suitable form for application but also concentrated composition which require dilution or extension with a suitable quantity of additional liquid or solid adjuvant prior to application.

The N-formylcarbanilates of this invention are also useful as fungicides, insecticides, nematocides, algaecides, bactericides, bacteriostats, and fungistats.

The following examples will illustrate the invention. In these examples, as well as in the specification and appended claims, parts and percent are by weight unless otherwise indicated.

EXAMPLE 1

This example describes the preparation of ethyl N-(3-chloro-4-methylphenyl)formimidate, an intermediate compound used in preparing compounds of this invention. The apparatus used in carrying out this example was a flask topped by a 16" packed distillation column. To the flask were added 283.2 g. (2 moles) of 3-chloro-4-methylaniline and 450 g. (3 moles) of ethyl orthoformate. A mild exothermic reaction occurred. To the flask was then added 5 g. of p-toluenesulfonic acid monohydrate and the mixture was heated. Alcohol began to come off at a pot temperature of about 90° C. In 2 hours the pot temperature had risen to 145° C. and 175 g. of alcohol had been collected. At the end of 4 hours the pot temperature had reached 190° C. and 196 g. (4.3 moles) of alcohol had been collected. The residual crude product remaining in the flask was vacuum distilled. After taking a first cut of ethyl orthoformate the product came over at B.P. 9+ mm. 125–127° C., weight 313 g. and $n_D^{25}$ 1.5400. An elemental analysis of this product yielded the following results:

Calc'd for $C_{10}H_{12}ClNO$ (percent): C, 60.8; H, 6.1. Found (percent): C, 60.7; H, 6.2.

EXAMPLE 2

This example describes the preparation of ethyl 5'-chloro-N-formyl-2'-methylcarbanilate. The equipment used was a liter 4-neck flask topped by a reflux condenser. The flask was charged with 32.5 g. (0.3 mole) of ethyl chloroformate and 100 g. of heptane, heated to 80° C. and then 49.4 g. (0.25 mole) of ethyl N-(5-chloro-2-methylpenyl)formimidate prepared in a similar manner to Example 1 was added with stirring over a period of ten minutes. There was no detectable exothermic reaction and heat was applied to the flask. Refluxing began at 90° C., but in a few minutes the temperature, with heavy reflux, had dropped to 85° C., indicating the formation of ethyl chloride. The condenser water was cut back to allow distillation of the ethyl chloride. After one-half hour refluxing at a pot temperature of 95° C., the reaction product was transferred to a beaker and chilled but it did not crystallize. The reaction product was then vacuum distilled slowly using a Vigreux column and the results of this distillation are reported in the following table:

| Cut No. | B.P. ° C. | Pressure, mm. of Hg | Wt., g. | $n_D^{25}$ |
| --- | --- | --- | --- | --- |
| 1 | 90–112 | 0.1 | 8.5 | 1.5295 |
| 2 | 111–116 | 0.08 | 6.5 | 1.5277 |
| 3 | 116–118 | 0.08 | 39 | 1.5269 |

An elemental analysis of cut 3, the desired product, yielded the following results:

Calc'd for $C_{11}H_{12}ClNO_3$ (percent): C, 54.7; H, 5.0; Cl, 14.7. Found (percent): C, 54.7; H, 5.3; Cl, 14.0.

EXAMPLE 3

This example describes the preparation of isopropyl N-formylcarbanilate. Similar equipment was used in Example 3 as was used in Example 2. The flask was charged with 65 g. of isopropyl chloroformate and 100 g. of heptane and then 75 g. of ethyl N-phenylformimidate (0.5 mole) made in an analogous manner to the formimidate of Example 1 was added over a period of 5 minutes with stirring at 35° C. Upon completion of the formimidate addition the flask was heated and refluxing began at 85° C. Cooling water in the reflux condenser was adjusted to allow ethyl chloride to escape. Refluxing gently of the reaction mixture was continued overnight and the final pot temperature the next morning 103° C. At this time there were two layers in the flask. The crude product in the flask was now vacuum distilled taking a product cut B.P.$_{0.05 mm.}$ 78–80° C., $n_D^{25}$ 1.5082, and weighing 87 g. An elemental analysis of this product yielded the following results:

Calc'd for $C_{11}H_{13}NO_3$ (percent): C, 63.7; H, 6.3. Found (percent): C, 64.0; H, 6.4.

In the procedure of Example 3, if instead of ethyl N-phenylformimidate, there is used an equimolar amount of ethyl N-(2-methylphenyl)formimidate, ethyl N-(2-methoxyphenyl)formimidate, ethyl N-(3-chlorophenyl)formimidate, or ethyl N-(2-hydroxyphenyl)formimidate, the resultant products are, respectively: isopropyl N-formyl-2'-methylcarbanilate, isopropyl, N-formyl-2'-methoxycarbanilate, isopropyl 3'-chloro-N-formylcarbanilate, and isopropyl N-formyl-2'-hydroxycarbanilate.

EXAMPLE 4

This example describes the preparation of isopropyl 5'-chloro-N-formyl-2-methylcarbanilate. Similar equipment was used in this example as was used in Example 2. To the flask was added 99 g. (0.5 mole) of ethyl N-(5-chloro-2-methylphenyl)formimidate prepared in a similar manner to Example 1, 70 g. of isopropyl chloroformate and 100 g. of toluene. The reaction mixture was heated and an apparent exothermic reaction took place at 70° C. The temperature of the reaction mixture rapidly rose to 90° C., then climbed to 119° C. in an hour. Heating was stopped, the flask and contents were cooled, and the crude product remaining in the flask was distilled under vacuum, taking a product cut 93–97° C. at 0.05 mm. of Hg., $n_D^{25}$ 1.5157, weight 119 g. of a colorless syrup. No fore-cut was taken in this instance. An elemental analysis of the product yielded the following results:

Calc'd for $C_{12}H_{14}ClNO_3$ (percent): C, 56.4; H, 5.5; Cl, 13.9. Found (percent): C, 56.4; H, 5.7; Cl, 14.0.

EXAMPLE 5

This example describes the preparation of isopropyl 3'-chloro-N-formyl-4'-methylcarbanilate, and was carried out in a similar manner as Example 4 except as noted. The flask was charged with 99 g. of ethyl N-(3-chloro-4-methylphenyl)formimidate prepared in a similar manner to Example 1. The same amounts as in Example 4 of the other reactants were then charged to the flask. In this instance, on heating there was no indication of an exothermic reaction. The reaction mixture was heated over an hour period at reflux and the final pot temperature was 119° C. The crude product remaining in the flask was vacuum distilled, taking no forecut since apparently none was needed. The product was a colorless syrup, B.P.$_{0.05}$ 108–115° C., weight 116.5 g. and $n_D^{25}$ 1.5214. An elemental analysis of the product yielded the following results:

|  | Percent |
|---|---|
| Carbon | 56.2 |
| Hydrogen | 5.6 |
| Chlorine | 14.0 |

EXAMPLE 6

This example describes the preparation of methyl 3',4'-dichloro-N-formylcarbanilate. This example is carried out in an analogous manner to Example 2 and using similar equipment. The flask was charged with 109 g. (0.5 mole) of ethyl N-(3,4-dichlorophenyl) formimidate prepared in an analogous manner to Example 1, 55 g. of methyl chloroformate and 100 g. of toluene and then heated to reflux. At 70° C. an exothermic reaction was noted, the temperature rising to 78° C. Refluxing was continued for one hour after the exothermic reaction had subsided to a final pot temperature of 105° C. The crude product remaining in the flask at the end of the refluxing period was clear and water white. The crude product was cooled and vacuum distilled, first with water aspirator vacuum to a pot temperature of 130° C. to remove the solvent and unreacted monomer, and then under high vacuum to distill the product. A fore-cut was taken, B.P.$_{0.2}$ 120–133° C., weight 6 g., $n_D^{25}$ 1.5579, and then the main product cut was taken, B.P.$_{0.2-0.3}$ 133–138° C., as a colorless syrup, weight 108 g. and $n_D^{25}$ 1.5595. An elemental analysis of the product yielded the following results:

Calc'd for $C_9H_7Cl_2NO_3$ (percent): C, 43.6; H, 2.8; Cl, 28.6. Found (percent): C, 43.8; H, 3.0; Cl, 29.4.

If in the procedure of Example 6 instead of ethyl N-(3,4-dichlorophenyl)formimidate, there is used an equimolar amount of ethyl N-(3,4-dibromophenyl)formimidate, ethyl N-(3,4-diiodophenyl)formimidate, ethyl N-(3,4-difluorophenyl)formimidate, ethyl N-(2,4,5-trichlorophenyl)formimidate, ethyl N-(2,3,4,6-tetrachlorophenyl)formimidate, or ethyl N-(pentachlorophenyl)formimidate, the resulting products are, respectively: methyl 3',4'-dibromo-N-formylcarbanilate, methyl 3',4'-diiodo-N-formylcarbanilate, methyl 3',4'-difluoro-N-formylcarbanilate, methyl 2',4',5'-trichloro-N-formylcarbanilate, methyl 2',3',4',6'-tetrachloro-N-formylcarbanilate, and methyl pentachloro-N-formylcarbanilate.

If in the procedure of Example 6 instead of methyl chloroformate, there are used an equimolar amount of methyl bromoformate, methyl iodoformate, or methyl fluoroformate, the resulting product is the same.

EXAMPLE 7

This example describes the preparation of isopropyl 3',4'-dichloro-N-formylcarbanilate. A flask was charged with 109 g. (0.5 mole) of ethyl N-(3,4-dichlorophenyl) formimidate made in a similar manner to Example 1, 65 g. of isopropyl chlorocarbonate and 100 g. of heptane and then the reaction mixture was gently refluxed for 40 hours. On cooling a layering occurred in the flask, the heavier layer solidifying. The flask was then charged with 150 ml. of heptane and 150 ml. of toluene and heated to give a homogenous solution. This solution was then filtered and the filtrate was placed in a deep freeze. The desired product crystallized out, was separated by filtration, washed with heptane and air dried. The product was in the form of feathery white crystals, M.P. 64° C., and weighed 105 g. An elemental analysis of the product yielded the following results:

Calc'd for $C_{11}H_{11}ClNO_3$ (percent): C, 47.8; H, 4.0; Cl, 25.7. Found (percent): C, 47.9; H, 4.2; Cl, 26.9.

EXAMPLE 8

This example describes the preparation of isopropyl 2'-chloro-N-formyl-5'-methylcarbanilate. A flask was charged with 99 g. (0.5 mole) of ethyl N-(2-chloro-5-methylphenyl)-formimidate prepared in a similar manner to Example 1, 70 g. of isopropyl chloroformate and 100 g. of toluene and then the reaction mixture was heated with stirring under reflux to a pot temperature of 107° C. Time of heating was 4.5 hours. The product was then vacuum distilled, first under water aspirator vacuum to remove the solvent and unreacted monomer, then under a high vacuum of 1 mm. of Hg, taking the product cut 136–138° C., weight 100 g., and $n_D^{25}$ 1.5169. The product turned out to be a mushy solid and was refractionated carefully, using a Vigreux column at 0.05 mm., of Hg, pressure. The results of this distillation are summarized in the following table:

| Cut No. | B. P. °C. | Wt., g. | $n_D^{25}$ | Comments |
|---|---|---|---|---|
| 1 | 85–92 | 18 | 1.5192 | |
| 2 | 92–95 | 74 | 1.5141 | Solid, M. P. 52–55° C. |

NOTE.—Residue about 3 g.

An elemental analysis of the product cut 2 yielded the following results:

Calc'd for $C_{11}H_{14}ClNO_3$ (percent): C, 54.2; H, 5.8; Cl, 11.5. Found (percent): C, 56.4; H, 5.6; Cl, 14.8.

EXAMPLE 9

This example describes the preparation of 2-chloroethyl 3',4'-dichloro-N-formylcarbanilate. The equipment used is similar to that used in the other examples. A flask was charged with 110 g. (0.5 mole) of ethyl N-(3,4-dichlorophenyl) formimidate, 175 ml. of toluene and 78.5 g. (0.55 mole) of 2-chloroethyl chloroformate. An exothermic reaction occurred with the temperature rising to 78° C. and with the turbid reaction mixture becoming clear and rather vigorously evolving chloroethane. The reaction mixture was then gently refluxed for ½ hour to a final pot temperature of 110° C. The solvent and excess chloroformate were removed under vacuum and at a pot temperature of 180° C. there was some evidence of decomposition, so the distillation was stopped and the residual product in the flask cooled to 75° C. and stirred overnight with 5 grams of carbon to remove the light greenish-brown color. The carbon was removed by filtration; however, the product solidified on the funnel. A portion of the product was recrystallized from a heptane/toluene mixture, and a nice crystalline product obtained melting at 92–94° C. An elemental analysis of this product yielded the following results:

Calc'd for $C_{10}H_8Cl_3NO_3$ (percent): C, 40.5; H, 2.7; Cl, 35.9. Found (percent): 40.8; H, 3.0; Cl, 35.9.

The plugged filter was leached with 300 ml. of boiling benzene and the solution filtered. The filtrate was admixed with 300 ml. of heptane, seeded and placed in an ice box. The white crystals which separated in the ice box were washed with 50:50 heptane/benzene and air dried to yield 101 g., M.P. 94–95° C. of product.

EXAMPLE 10

This example describes the preparation of 4-chloro-2-butynyl-3'-chloro-N-formylcarbanilate. Into a reaction vessel equipped as in Example 2 was added 36.7 parts of ethyl N-(3-chlorophenyl)formimidate, 33.7 parts of 4-chloro-2-butynyl-chloroformate and 100 parts of toluene. The reaction mixture was heated at reflux until the evolution of chloroethane was substantially complete and then the solvent was removed under vacuum. The residue was dissolved in methyl alcohol, carbon added, and the solution filtered. The methyl alcohol was removed under vacuum at 100° C., at a pressure of 1.0 mm. of mercury to recover 45.0 parts of viscous syrup product.

Calc'd for $C_{12}H_{11}Cl_2NO_3$ (percent): C, 44.95; H, 2.50; N, 4.37. Found (percent): C, 44.80; H, 2.60; N, 4.34.

EXAMPLE 11

This example describes the preparation of isopropyl m-chloro-N-formylcarbanilate. Into a reaction vessel equipped as in Example 2 was charged 92 parts of ethyl N-(m-chlorophenyl) formimidate, 73.5 parts of isopropyl chloroformate and 150 parts of methylcyclohexane. The reaction mixture was refluxed for 3 hours and then allowed to stand overnight at room temperature. The reaction mixture was filtered and the filtrate fractionated using a Vigreux column to obtain the product fraction boiling in the range of 106–108° C., at a pressure of 0.2 mm. of mercury, $n_D^{25}$ 1.5199 and amounting to 100.5 parts.

Calc'd for $C_{11}H_{12}ClNO_3$ (percent): C, 54.67; H, 5.00; Cl, 14.67; N, 5.80. Found (percent): C, 54.86; H, 4.99; Cl, 14.80; N, 5.82.

EXAMPLE 12

In this example, the pre-emergence phytotoxic activity of some of the N-formylcarbanilates of this invention was determined in greenhouse tests in which a specific number of seeds of a number of different plants, each representing a principal botanical type, were planted in aluminum pans.

A good grade of top soil was placed in aluminum pans and compacted to a depth of ⅜ to ½ inch from the top of the pan. On the top of the soil were placed a predetermined number of seeds of each of the following plant species. Morning glory, wild oat, brome grass, rye grass, radish, sugar beet, giant foxtail, crabgrass, pigweed, soybean, wild buckwheat, tomato, sorghum. In some tests seeds of cotton, corn, barnyard grass, rice and smartweed were also added. In the surface applications the seeds were covered by overfilling the pan with soil and striking it level. The measured amount of chemical in a suitable solvent or as a wettable powder was applied to this surface. In the soil incorporation treatments the soil required to level fill the pans after seeding was weighed into a pan, a known amount of the chemical applied in a solvent or as a wettable powder, the soil thoroughly mixed and used as a cover layer for seeded pans. After treatment the pans were moved into a greenhouse bench where they were watered from below as needed to give adequate moisture for germination and growth.

Approximately 14 days after seeding and treating the plants were observed and the results recorded. The phytotoxic activity index is based on the average percent germination of each seed lot. The activity index is converted to a relative numerical scale for the sake of brevity and simplicity in the examples. The pre-emergent phytotoxic activity index used in this example is defined as follows.

| Average percent germination | Numerical scale | Phytotoxic activity |
|---|---|---|
| 76–100 | 0 | No phytotocity. |
| 51–75 | 1 | Slight phytotoxicity. |
| 26–50 | 2 | Moderate phytotoxicity. |
| 0–25 | 3 | Severe phytotoxicity. |

The pre-emergence phytotoxic activity of some of the N-formylcarbanilates of this invention are recorded in Table I for various application rates of the N-formylcarbanilates in both surface and soil-incorporated applications. In Table I, the various seeds are represented by letters as follows:

A—General grass  
B—General broadleaf  
C—Morning glory  
D—Wild oats  
E—Brome grass  
F—Rye grass  
G—Radish  
H—Sugar beet  
I—Cotton  
J—Corn  
K—Foxtail  
L—Barnyard  
M—Crab grass  
N—Pigweed  
O—Soybean  
P—Wild buckwheat  
Q—Tomato  
R—Sorghum  
S—Rice  
T—Smartweed Individual phytotoxicity ratings for each plant type are reported in Table I. In addition, the total phytotoxic rating for all grass plants and the total injury rating for all broadleaf plants are also reported in Table I.

The data in Table I illustrate the outstanding general and selective phytotoxic activity of some of the N-formylcarbanilates of this invention.

TABLE I.—PRE-EMERGENCE PHYTOTOXIC ACTIVITY

| Ex. No. | Compound | Rate, lb./acre | A | B | C | D | E | F | G | H | I | J | K | L | M | N | O | P | Q | R | S | T | Grass | Broadleaf | Comments |
|---|---|---|---|---|---|---|---|---|---|---|---|---|---|---|---|---|---|---|---|---|---|---|---|---|---|
| 2 | Ethyl 5'-chloro-N-formyl-2'-methylcarbanilate. | 5 | 3 | 3 | 2 | 3 | 1 | 1 | 2 | 3 | | | 3 | | 3 | 3 | 2 | 2 | 1 | 2 | | | 13 | 15 | (¹) |
| 3 | Isopropyl N-formylcarbanilate. | 25 | 3 | 2 | 3 | 3 | 3 | 3 | 0 | 0 | | | 2 | | 3 | 0 | 1 | 3 | 3 | 3 | | | 17 | 10 | (¹) |
|   |   | 5 | 2 | 1 | 1 | 3 | 3 | 3 | 2 | 1 | 0 | 3 | 0 | 1 | 0 | 0 | 0 | 3 | 3 | 0 | 1 | | 14 | 10 | (²) |
|   |   | 1 | 1 | 0 | 0 | 3 | 3 | 3 | 1 | 1 | 0 | 1 | 0 | 0 | 0 | 0 | 2 | 1 | 0 | 0 | | | 10 | 5 | (²) |
| 6 | Methyl 3',4'-dichloro-N-formylcarbanilate. | 5 | 1 | 2 | 0 | 1 | 2 | 2 | 2 | 3 | | | | | 3 | 3 | 0 | 3 | 0 | 0 | | | 8 | 11 | (¹) |
| 9 | 2-chloroethyl-3',4'-dichloro-N-formyl carbanilate. | 25 | 2 | 0 | 0 | 0 | 1 | 2 | 0 | 0 | | | 3 | | 3 | 3 | 0 | 1 | 0 | 0 | | | 9 | 4 | (¹) |
| 11 | Isopropyl m-chloro-N-formylcarbanilate. | 5 | 3 | 3 | 3 | 3 | 3 | 3 | 2 | 3 | | | 3 | | 3 | 1 | 0 | 3 | 3 | 3 | | | | | (¹) |
|   |   | 1 | 3 | 2 | 2 | 3 | 3 | 3 | 1 | 2 | 1 | 3 | 3 | 3 | 3 | 2 | 0 | 3 | 3 | 1 | 3 | | | | (¹) |
|   |   | ¼ | 2 | 0 | 1 | 3 | 2 | 3 | 0 | 0 | 0 | 1 | 2 | 3 | 2 | 0 | 0 | 1 | 1 | 1 | 3 | | | | (¹) |

¹ Surface application.
² Incorporation in soil.

EXAMPLE 13

In this example, the post-emergent phytotoxic activity of some of the N-formylcarbanilates of this invention was determined in greenhouse tests. The N-formylcarbanilates to be tested were applied in spray form to plants of a given age of the same grasses and broadleaf plants as used in the pre-emergence tests described in Example 12. The same number of seeds of the same plants used in Example 12 were planted in aluminum pans. After the plants were the desired age, each aluminum pan was sprayed with a given volume of a 0.5% concentration solution of the candidate chemical, corresponding to a rate of approximately 10 lbs. per acre. Some of the chemicals were also tested at lower percent concentrations as indicated in Table II below. This herbicidal solution was prepared from an aliquot of a 2% solution of the candidate compound in acetone, a known amount of cyclohexanone-emulsifying agent mix, and sufficient water to make up to volume. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed and recorded after approximately 14 days. Results and further details are reported in Table II.

The post-emergent phytotoxic activity index used in this example is based on the average percent injury of each plant species and is defined as follows.

| Average percent injury | Numerical scale | Phytotoxic activity |
|---|---|---|
| 0-25 | 0 | No phytotoxicity. |
| 26-50 | 1 | Slight phytotoxicity. |
| 51-75 | 2 | Moderate phytotoxicity. |
| 76-99 | 3 | Severe phytotoxicity. |
| 100 | 4 | Plants dead. | tions of this invention to serve in providing uniform dispersions of all formulation components in both liquid and particulate solid form can be anionic, cationic or nonionic including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acid; the sulfonated animal, vegetable, and mineral oils; quaternary salts of high molecular weight acids; rosin soaps, such as salts of abietic acid; sulfuric acid salts of high molecular weight organic compounds; algin soaps, ethylene oxide condensated with fatty acids; alkyl phenols and mercaptans; and other

TABLE II.—POST-EMERGENT PHYTOTOXIC ACTIVITY

| Ex. No. | Compound | Rate percent | A | B | C | D | E | F | G | H | I | J | K | L | M | N | O | P | Q | R | S | Total phytotoxic rating Grass | Broad leaf |
|---|---|---|---|---|---|---|---|---|---|---|---|---|---|---|---|---|---|---|---|---|---|---|---|
| 2 | Ethyl 5'-chloro-N-formyl-2'-methylcarbanilate. | 0.5 | 0 | 1 | 2 | 0 | 0 | | 1 | 2 | | | 1 | | 1 | 4 | 1 | 1 | 2 | 0 | | 2 | 13 |
| 5 | Isopropyl 3'-chloro-N-formyl-4'-methylcarbanilate. | 0.5 | 2 | 2 | 1 | 0 | 2 | 2 | 4 | 4 | | | 3 | | 4 | | 1 | 4 | 4 | 2 | | 13 | 18 |
| 6 | Methyl 3',4'-dichloro-N-formylcarbanilate. | {0.5 / 0.2} | 2 / 0 | 3 / 2 | 2 / 1 | 4 / 1 | 3 / 1 | 3 / 0 | 4 / 4 | 4 / 3 | / 1 | | 3 / 0 | / 0 | 2 / 1 | 3 / 1 | 2 / 1 | 4 / 4 | 4 / 4 | 2 / 0 | | 17 / 3 | 23 / 19 |
| 7 | Isopropyl 3',4'-dichloro-N-formylcarbanilate. | 0.5 | 1 | 2 | 0 | 1 | 1 | 1 | 4 | 3 | | | 2 | | 2 | 3 | 1 | 3 | 4 | 0 | | 7 | 18 |
| 10 | 4-chloro-2-butynyl-3'-chloro-N-formylcarbanilate. | {0.5 / 0.2} | 2 / 0 | 1 / 0 | 1 / 1 | 3 / 2 | 3 / 1 | | 1 / 1 | | 1 / 2 | | 3 / 0 | | 2 / 0 | 3 / 1 | 1 / 0 | 2 / 2 | 2 / 1 | | | | |
| 11 | Isopropyl m-chloro-N-formylcarbanilate | 0.5 | 2 | 1 | 2 | 3 | | 2 | 1 | 1 | | | 4 | | 3 | 4 | 2 | 1 | 1 | 3 | | | |

As demonstrated in the examples above, quite different effects can be obtained by modifying the method of use of the phytotoxic compositions of this invention. The active ingredient need not be dissolved in the liquid extending agent but can be dispersed or suspended therein as a suspension or emulsion. Also, the active ingredient can first be dissolved in a suitable organic solvent and the organic solution of the active ingredient then incorporated in water or an aqueous extending agent to form a heterogenous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g. those boiling almost entirely under 400° F. at atmospheric pressure and having flask points above about 80° F., particularly kerosene), and the like. Where true solutions are desired mixtures of organic solvents have been found to be useful, for example, 1:1 and 1:2 mixtures of xylene and cyclohexanone.

Solid adjuvants in the form of particulate solids are very useful in the practice of the present invention because of the low solubility properties of the N-formylcarbanilates of this invention. In using this type of adjuvant, the active ingredient is either adsorbed or dispersed on or in the finely-divided solid material. Preferably the solid materials are not hydroscopic but are materials which render the composition permanently dry and free flowing. Suitable particulate solids include the natural clays, such as china clays, the bentonites and the attapulgites; other minerals in natural state, such as talc, pyrophyillite, quartz, diatomaceous earth, fuller's earth, chalk, rock phosphate, koalin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such powdered cork, powdered wood and powdered pecan or walnut shells. These materials are used in finely-divided form, at least in a size range of 20-40 mesh and preferably in much finer size.

The surface active agent, that is the wetting, emulsifying or dispersion agent, used in the phytotoxic composisimple and polymeric compositions having both hydrophilic and hydrophobic functions.

The liquid phytotoxic compositions of this invention preferably comprise 0.01% to 99% by weight of the active ingredient with the remainder being phytotoxic adjuvant which can be liquid extending agent or surface active agent (including adhesive agent), but preferably is an admixture thereof. Normally it is preferred that the phytotoxic adjuvant be the major component in the composition, i.e. be present in the composition in excess of 50% by weight. Preferably the surface active agent comprises from 0.1% to 15% by weight of the total composition. The remainder of the composition is the liquid extending agent.

The concentration of active ingredient in the particulate solid or dust compositions of this invention can vary over wide ranges depending upon the nature of the solid adjuvant and the intended use of the composition. Since the active ingredients of this invention have high toxicities and are applied at low rates in order to obtain selectivity, the concentration of the active ingredient in the dust composition can be low and may comprise as little as 1% or less by wt. of the total dust composition. By contrast, when the dust composition is to be used for soil sterilization, it may be desirable to have a very high concentration of active ingredient and for such use the active ingredient can comprise as much as 5% to 98% by wt. of the total composition. The remainder of the compositions is the phytotoxic adjuvant which is usually only the particulate solid extending agent. Normally it is preferred that the solid phytotoxic adjuvant be the major component in the composition, i.e. be present in the composition in excess of 50% by wt. Thus, the surface active agent is not usually required in dust compositions although it can be used if desired. However, if the particulate solid compositions are to be applied as a wettable powder, a surface active agent must be added to the composition and ordinarily the amount of surface active agent will be in the range of 0.1% to 15% by wt. of the composition.

The phytotoxic compositions of this invention can also contain other additaments, for example fertilizers, other phytotoxicants, pesticides and the like, used as adjuvant or in combination with any of the above-described adjuvants. Phytotoxicants useful in combination with the above-described compounds include for example 2,4-dichlorophenoxyacetic acid, 2,4,5 - trichlorophenoxyacetic acid, 2 - methyl - 4 - chlorophenoxyacetic acid and the salts, esters and amides thereof; triazine derivatives such as 2,4 - bis(3-methoxypropylamino)-6-methylthio-S-triazine, 2 - chloro - 4 - ethylamino-6-isopropylamino-S-triazine and 2 - ethylamino-4-isopropylamino-6-methylmercapto-S-triazine, urea derivatives such as 3-(3,4-dichlorophenyl)-1,1-dimethyl urea and 3-(p-chlorophenyl)-1,1-dimethyl urea, acetanilides such as N-isopropyl-α-chloro-acetanilide, N - ethyl-α-chloro-2-methylacetanilide and 2-tert-butyl-2'-chloro-6-methylacetanilide, and acetamides such as N,N-diallyl-α-chloroacetamide, N-(α-chloroacetyl)hexamethylene imine, N,N-diethyl-α-bromoacetamide and the like. Fertilizers useful in combination with the active ingredients include for example ammonium nitrate, urea and superphosphate. Other useful additaments include materials in which plant organisms take root and grow such as compost, manure, humus, sand and the like.

The phytotoxic compositions of this invention are applied to the plant systems in the conventional manner. Thus, the dust and liquid compositions may be applied to the plant systems by the use of power-dusters, boom and hand sprayers and spray-dusters. The compositions of this invention can also be applied from airplanes as a dust or a spray because they are effective in a low dosage. In order to modify or control the growth of germinating seeds or emerging seedlings, the dust and liquid compositions are applied with conventional methods to the surface of the soil or distributed in the soil to a depth of at least ½ inch below the soil surface. The phytotoxic compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by conventional discing, dragging or mixing operations.

The application of an effective amount of the N-formylcarbanilate to the plant system is essential in the practice of the present invention. The exact dosage to be applied is dependent not only upon the specific N-formylcarbanilate but also upon the particular plant species to be controlled and the stage of growth thereof as well as the part of the plant to be contacted with the toxicant. In non-selective foliage treatments, the phytotoxic compositions of this invention are usually applied at a rate sufficient to obtain from 5 to 50 lbs. of N-formylcarbanilate per acre but lower or higher rates can be applied in some cases. In non-selective pre-emergence treatments, the phytotoxic compositions are usually applied at a somewhat lower rate than in foliage treatments but at a rate which is ordinarily within the same general range, that is at a rate in the range of 1 to 25 lbs. per acre. However, because of the high unit activity possessed by the N-formylcarbanilates of this invention, soil sterilization is ordinarily accomplished at a rate of application in the range of 5 to 25 lbs. per acre. In selective pre-emergence applications to the soil, a dosage of from 1 to 5 lbs. of active ingredient per acre is usually employed but lower or higher rates may be necessary in some instances. It is believed that one skilled in the art can readily determine from this disclosure, including the examples, the optimum rate to be applied in any particular case.

The terms "soil" and "growth media" are employed in the present specification and claims in their broadest sense to be inclusive of all conventional "soils" as defined in Webster's New International Dictionary, Second Edition, Unabridged (1961). Thus the terms refer to any substance or media in which vegetation may take root and grow, and are intended to include not only earth but compost, manure, muck, humus, sand and the like, adapted to support plant growth.

What is claimed is:

1. Herbicidal composition comprising an adjuvant and an effective amount of a compound of the formula:

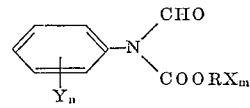

wherein Y is selected from the class consisting of halogen, hydroxyl, alkyl and alkoxy of not more than 5 carbon atoms, R is hydrocarbyl of not more than 5 carbon atoms selected from the group consisting of alkyl, alkenyl and alkynyl, X is halogen, $n$ is an integer from 0 to 5, inclusive, and $m$ is an integer from 0 to 3, inclusive.

2. Composition of claim 1 wherein R is alkyl, X is chloride, $m$ is an integer from 0 to 3, Y is chloride and $n$ is an integer from 1 to 3.

3. Composition of claim 1 wherein R is alkyl, X is chloride, $m$ is an integer from 0 to 3, Y is alkyl and $n$ is an integer from 1 to 3.

4. Composition of claim 1 wherein R is alkenyl X is chloride, $m$ is an integer from 0 to 3, Y is alkyl and $n$ is an integer from 1 to 3.

5. Composition of claim 1 wherein R is alkynyl, X is chloride, $m$ is an integer from 0 to 3, Y is chloride and $n$ is an integer from 1 to 3.

6. Composition of claim 1 wherein said compound is isopropyl N-formylcarbanilate.

7. Composition of claim 1 wherein said compound is isopropyl 3'-chloro-N-formyl-4'-methylcarbanilate.

8. Composition of claim 1 wherein said compound is methyl 3',4'-dichloro-N-formylcarbanilate.

9. Composition of claim 1 wherein said compound is 4-chloro-2-butynyl 3'-chloro-N-formylcarbanilate.

10. Composition of claim 1 wherein said compound is isopropyl 3',4'-dichloro-N-formylcarbanilate.

11. Composition of claim 1 wherein said compound is isopropyl 3'-chloro-N-formylcarbanilate.

12. Composition of claim 1 wherein $n$ is an integer of from 0 through 3.

13. Herbicidal method which comprises applying an effective amount of a compound of the formula:

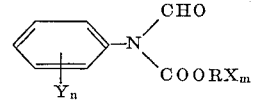

wherein Y is selected from the group consisting of halogen, hydroxyl, alkyl and alkoxy of not more than 5 carbon atoms, R is hydrocarbyl of not more than 5 carbon atoms selected from the group consisting of alkyl, alkenyl and alkynyl, X is halogen, $n$ is an integer from 0 to 5, inclusive and $m$ is an integer from 0 to 3, inclusive.

14. Method of claim 13 wherein said compound is isopropyl 3'-chloro-N-formylcarbanilate.

15. Method of claim 13 wherein said compound is isopropyl 3'-chloro-N-formyl-4'-methylcarbanilate.

16. Method of claim 13 wherein said compound is methyl 3',4'-dichloro-N-formylcarbanilate.

17. Method of claim 13 wherein said compound is 4-chloro-2-butynyl 3'-chloro-N-formylcarbanilate.

18. Method of claim 13 wherein said compound is isopropyl 3',4'-dichloro-N-formylcarbanilate.

19. Method of claim 13 wherein said compound is isopropyl 3'-chloro-N-formylcarbanilate.

References Cited
UNITED STATES PATENTS 3,245,774  4/1966  Bachmann _____ 71—111
2,812,247  11/1957  Gysin et al. _____ 71—111

LEWIS GOTTS, Primary Examiner

C. L. MILLS, Assistant Examiner

U.S. Cl. X.R.

71—70, 76, 93, 109, 110